(12) United States Patent
Bonnet

(10) Patent No.: US 7,939,961 B1
(45) Date of Patent: May 10, 2011

(54) WIND TURBINE WITH INTEGRATED DESIGN AND CONTROLLING METHOD

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/768,880

(22) Filed: Apr. 28, 2010

(51) Int. Cl.
*F03D 7/00* (2006.01)

(52) U.S. Cl. ............................................. 290/55; 290/44

(58) Field of Classification Search ............... 290/55
See application file for complete search history.

(56) References Cited

U.S. PATENT DOCUMENTS

| | | | |
|---|---|---|---|
| 1,334,485 A * | 3/1920 | Clipfell et al. | 290/55 |
| 4,066,911 A * | 1/1978 | Sarchet | 290/44 |
| 5,315,159 A * | 5/1994 | Gribnau | 290/55 |
| 6,951,443 B1 * | 10/2005 | Blakemore | 415/4.3 |
| 7,218,013 B2 * | 5/2007 | Platt | 290/55 |
| 7,323,792 B2 * | 1/2008 | Sohn | 290/55 |
| 7,550,864 B2 * | 6/2009 | Anderson et al. | 290/55 |
| 2003/0227174 A1 * | 12/2003 | Bayly | 290/55 |
| 2010/0133838 A1 * | 6/2010 | Borgen | 290/52 |
| 2010/0266412 A1 * | 10/2010 | Barber | 416/147 |
| 2010/0303623 A1 * | 12/2010 | Dawoud et al. | 416/44 |

FOREIGN PATENT DOCUMENTS

| | | |
|---|---|---|
| EP | 1394406 A3 | 3/2004 |
| JP | 2001346359 A | 12/2001 |

* cited by examiner

*Primary Examiner* — Joseph Waks
(74) *Attorney, Agent, or Firm* — Global Patent Operations; Douglas D. Zhang

(57) ABSTRACT

A wind turbine is provided. The wind turbine includes a tower including a yaw interface, a bladed rotor including at least one blade rotatable in response to wind impinging upon the at least one blade, and a beam structure configured to support the bladed rotor. The beam structure includes at least two beam members. Each of the at least two beam members is coupled to the yaw interface by at least one joint element, so that the bladed rotor is rotatable about a yaw axis of the wind turbine. At least two of the joint elements are spaced apart along a longitudinal axis of the tower. Further, another wind turbine including a yaw interface and a method for controlling a yaw angle of a wind turbine are also provided.

20 Claims, 8 Drawing Sheets

WIND TURBINE WITH INTEGRATED DESIGN AND CONTROLLING METHOD

BACKGROUND OF THE INVENTION

The present disclosure relates to a wind turbine particularly, but not exclusively, suited for generating electricity. More particularly, the disclosure herein describes a wind-driven turbine intended for very large rotor sizes, such as for rotor sizes greater than 100 meter.

The field of multi-megawatt wind turbines has experienced an important development over the last years. In particular, the size of multi-megawatt wind turbines is doubling approximately every five years. This development targets lower cost of electricity (i.e., cents per kWh) which can be achieved by providing higher energy conversion. In order to reach higher energy conversion, the aerodynamic efficiency of the turbine may be improved or the rotor size may be increased. The latter is a straightforward solution to increase energy conversion in wind turbines.

In particular, by increasing the rotor size, the swept area is increased and, consequently, also the power output of the wind turbine. However, increasing the size of the rotor usually involves a dramatic increase in the size of the machinery. Particularly problematic is the implementation of the nacelle in large-scale wind turbines, due to its high mass. A further problem is the high load on the pitch and yaw bearings due to bending moments or thrust forces. In the case of large-scale wind turbines, this load can override the charging limit of the bearings. Moreover, large-scale wind turbines usually involve high dynamic loading of the rolling elements in the bearings. The blade-to-tower clearance might also be an issue in the design of large-scale wind turbines.

BRIEF DESCRIPTION OF THE INVENTION

In view of the above, a wind turbine for facilitating large rotor sizes is provided. Further, a wind turbine tower is provided. In addition, a method for controlling a yaw angle of a wind turbine is also provided.

In one aspect, a wind turbine is provided. The wind turbine includes a tower including a yaw interface, a bladed rotor including at least one blade rotatable in response to wind impinging upon the at least one blade, and a beam structure configured to support the bladed rotor. The beam structure includes at least two beam members. Each of the at least two beam members is coupled to the yaw interface by at least one joint element, so that the bladed rotor is rotatable about a yaw axis of the wind turbine. At least two of the joint elements are spaced apart along a longitudinal axis of the tower.

In another aspect, another wind turbine for generating electrical energy by wind energy is provided. The wind turbine includes a tower, a yaw interface disposed in an upper part of the tower. The yaw interface includes a plurality of bearings spaced apart along a longitudinal axis of the tower. The wind turbine further includes an annular structure including a rotor portion and a static portion, and a bladed rotor including at least one blade rotatable in response to wind impinging upon the at least one blade. The bladed rotor is supported by a rotor portion. The annular structure is coupled to the yaw interface, so that the bladed rotor is rotatable about a yaw axis.

In yet another aspect, a method for controlling a yaw angle of a wind turbine is provided. The wind turbine includes a tower, a bladed rotor, a beam structure including multiple beams supporting the bladed rotor and a plurality of bearings placed in the tower. Each of the bearings is spaced apart along the longitudinal axis of the tower and the plurality of bearings is coupled to the beam structure. The method includes measuring a yaw error, and adjusting the yaw angle of the bladed rotor in order to decrease the yaw error. The yaw angle of the bladed rotor is adjusted by coupling a torque force to the multiple beams through the plurality of bearings.

Further aspects, advantages, and features are apparent from the dependent claims, the description, and the accompanying drawings.

BRIEF DESCRIPTION OF THE DRAWINGS

A full and enabling disclosure, including the best mode thereof, to one of ordinary skill in the art, is set forth more particularly in the remainder of the specification, including reference to the accompanying figures wherein.

DETAILED DESCRIPTION OF THE INVENTION

Figure 1:
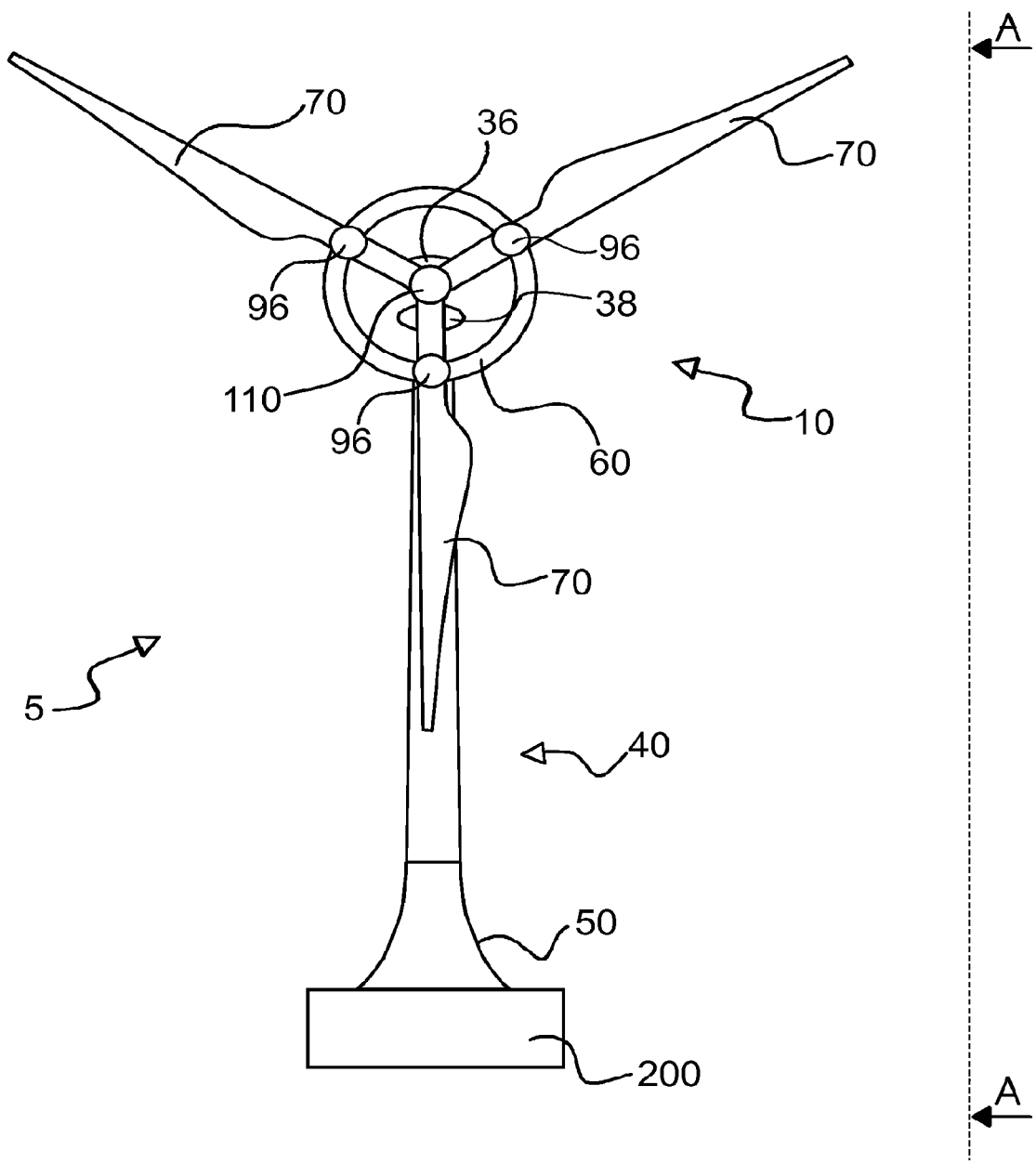
FIG. 1 shows a schematic view of a wind turbine according to embodiments described herein.

Reference will now be made in detail to the various embodiments, one or more examples of which are illustrated in the figures. Each example is provided by way of explanation, and is not meant as a limitation. For example, features illustrated or described as part of one embodiment can be used on or in conjunction with other embodiments to yield yet a further embodiment. It is intended that the present disclosure includes such modifications and variations.

The wind turbine as described in the present disclosure involves optimal handling of large loads, which are generally generated by the large span of the rotor blades and the large height of the tower. Further, the wind turbine as described herein is generally intended to enlarge traditional wind turbine design toward very large structural design.

The wind turbine includes a tower having a yaw interface. Generally, the yaw interface is for turning the wind turbine rotor components against the wind. According to some embodiments, the yaw interface is placed in an upper part of the tower.

Further, the wind turbine includes a bladed rotor having at least one blade rotatable in response to wind impinging upon the blade. A wind turbine according to typical embodiments has a three-blade configuration. However, a wind turbine according to embodiments of the present disclosure may be equipped with any number of blades.

Further, according to embodiments of the present disclosure, the wind turbine has a beam structure typically including two beam members. Alternatively, the beam structure may include more than two beam members. Typically, the beam structure includes three or more upper beams and a lower beam. Typically, the beam structure is used as support for the wind turbine rotor components. In particular, a beam structure according to at least some of the embodiments of the present disclosure represents a lightweight structural alternative to a standard nacelle placed on top of the tower. Further, such a beam structure typically provides a robust structural support for the components placed at the top of the wind turbine. Components typically placed at top of the wind turbine are the bladed rotor or the wind turbine generator. In particular, such a beam structure is capable of effectively absorbing large bending moments and torques originated by the different wind turbine elements attached thereto.

Typically, a beam structure of a wind turbine according to the present disclosure extends apart from the tower of the wind turbine in the direction of the rotational axis of the rotor of the wind turbine. Thereby, a wind turbine according to the present disclosure typically enables a larger blade-to-tower clearance (i.e., the distance between the blades and the tower along the rotational axis of the rotor) with respect to known wind turbines.

In typical embodiments, the beam members of the beam structure are attached to the yaw interface by joint elements which are spaced apart along the longitudinal axes of the tower. Thus, the force moments generated by the turbine rotor can be distributed along the longitudinal length of the tower. Thereby, the diameter of the rotor and, therefore, the blade span and the turbine swept area, can be extended. Further, a larger tower height can be realized as the bending torque in the tower is decreased since i) the overall load distribution is lowered by using lightweight components, such as a beam structure, and ii) the large bending moments acting on the top of the tower are distributed along its axis by using multiple joint elements. A larger tower height generally allows increased power output of the wind turbine, since the wind speed usually increases farther away from the ground.

In some particular embodiments, the tower is designed with a wide base. A wide tower base facilitates carrying greater weights typical of large-scale wind turbines and supports larger bending moments of the tower. Thereby, typical embodiments of the present disclosure provide a wind turbine with an extended swept area and an extended tower height.

The yaw interface may include multiple bearing devices spaced apart along the tower longitudinal axis. In particular, the tower may include an upper yaw bearing and a lower yaw bearing. Multiple bearing devices in the yaw interface make it possible to carry, in particular situations, large tower top bending moments within the capabilities of the rolling elements in the bearing devices.

Further, a wind turbine according to at least some of the embodiments described herein facilitates a modular design of the beam structure. A modular design of the beam structure significantly simplifies the on-site assembly of the wind turbine.

In typical embodiments, the beam structure supports the bladed rotor. That the beam structure supports the bladed rotor is to be taken within this disclosure as indicating that the weight of the rotor blade is principally carried by the beam structure. For example, the beam structure may directly support a bladed rotor, or the bladed rotor may be supported by the beam structure through an intermediate structure, such as an annular structure. In particular, the bladed rotor may be radially supported through the beam structure.

It is also contemplated that the bladed rotor further includes a rotational axis, the rotational axis being connected to the beam structure. The beam structure typically extends in the three spatial directions. In particular, the bladed rotor may further include a rotational axis such as, but not limited to, a rotating shaft or a rotating hub. The rotational axis may be integrated into or as part of an energy generator. According to some aspects, the rotational axis may be connected to the beam structure. Typically, the beam structure has at least two beam members. It is also typical that the beam members extend in the three spatial directions. The beam structure may thus provide a robust and lightweight support to the rotational axis of the rotor.

The strong structural properties of a beam structure facilitates horizontally extending the placement of the bladed rotor with respect to the tower. Thereby, the embodiments described herein provide a wind turbine which facilitates a larger blade-to-tower clearance. A larger blade-to-tower clearance yields a larger space for bending of the blades in response to wind. Typically, a larger blade diameter implies a larger bending thereof and, therefore, requires a larger blade-to-tower clearance. Thus, at least some embodiments of the present disclosure provide a wind turbine with enabling the implementation of large blade diameters and, consequently, large turbine swept areas. Furthermore, a large blade-to-tower clearance has the added beneficial result that the wind shadowing effect of the tower on the bladed rotor is reduced.

In the present disclosure, the term "radially supported" is to be taken to include that the weight of a particular element is carried by elements disposed concentrically to the central axis of that particular element. According to some embodiments, the bladed rotor is radially supported, i.e., the weight of the bladed rotor is mainly carried at positions concentric to the bladed rotor central axis. Supporting the bladed rotor in this manner is in contrast to the standard configuration of wind turbines where a main shaft is attached to a main rotor hub. Radially supporting the bladed rotor facilitates the carrying of larger blade bending moments. In addition, by radially supporting the bladed rotor, the overall stability of the rotor against harsh wind conditions and extreme loads originating from large blade spans is improved.

A wind turbine according to at least some of the embodiments facilitates the ability to enlarge the dimensions of the turbine in respect to traditional wind turbine concepts. In particular, according to some embodiments, the rotor blade has a length of at least about 50 meters, or at least 80 meters, and beyond. Further, according to some embodiments, the tower height is of at least 100 meters, or of at least 180 meters, and beyond. In general, as stated above, energy capture by the wind turbine scales with rotor size. Typically, optimal sizing of the turbine is determined considering different factors such as material properties or manufacturing technology. Those factors are particularly relevant for determining manufacturing costs.

Typically, both the generator rotor and the generator stator are part of the primary reinforcement means of the wind turbine for supporting, through first blade interfaces, the blades. The first blade interfaces may consist of, or may include, bearing devices.

In typical embodiments, a dual support over the annular generator and a central yoke is provided. Such a configuration generally targets an extended swept area of the wind turbine though extended blade span. Further, when the dual support is implemented through bearing devices, then large bending moments occasionally generated at the tower top can then be carried within the capabilities of the rolling elements in the bearing devices.

Within the following description of the drawings, the same reference numbers refer to the same components. Generally, only the differences with respect to the individual embodiments are described.

FIG. 1 shows a schematic view of a wind turbine 5 according to embodiments described herein. The exemplary wind turbine 5 includes a tower 40 having a tower base 50. The tower base 50 is typically built on a foundation element 200. Typically, the tower base 50 is designed significantly wider than the upper part of the tower. Further, a bladed rotor 10 having blades 70 is placed on an upper part of the tower 40. The upper part of the tower 40 is provided with an annular structure 60 having a rotor portion and a static portion. Typically, the bladed rotor 10 is rotatably coupled to the annular structure 60. According to some embodiments, the annular structure 60 is an annular generator 62.

Typically, the wind turbine is designed so that the tower height does not exceed a minimum operating height. Typically, the minimum operating height of the tower is the sum of the blades length and the turbine access area height relative to the horizontal plane of the tower foundations.

Typically, the beam structure supports the bladed rotor through the annular structure. In the typical case where the annular structure is an annular generator, then generally the bladed rotor is coupled to a generator rotor portion of the annular generator. Also typically, a generator static portion of the annular generator radially supports the generator rotor. In typical embodiments, the generator stator is radially supported by the beam structure. In particular, it is typical that the beam members are coupled to the generator stator through a plurality of joints on the generator stator, the plurality of joints being spaced apart along the generator stator. According to embodiments of the present disclosure, some elements of the wind turbine are shrouded by a fairing element. For example, the exemplary wind turbine 5 of FIG. 1 includes outer blade fairings shrouding the joints of blades 70 with the annular structure 60. Furthermore, the exemplary wind turbine 5 further includes an upper fairing 36, a lower fairing 38 and a central fairing element 110, which are discussed in detail below.

Figure 2:
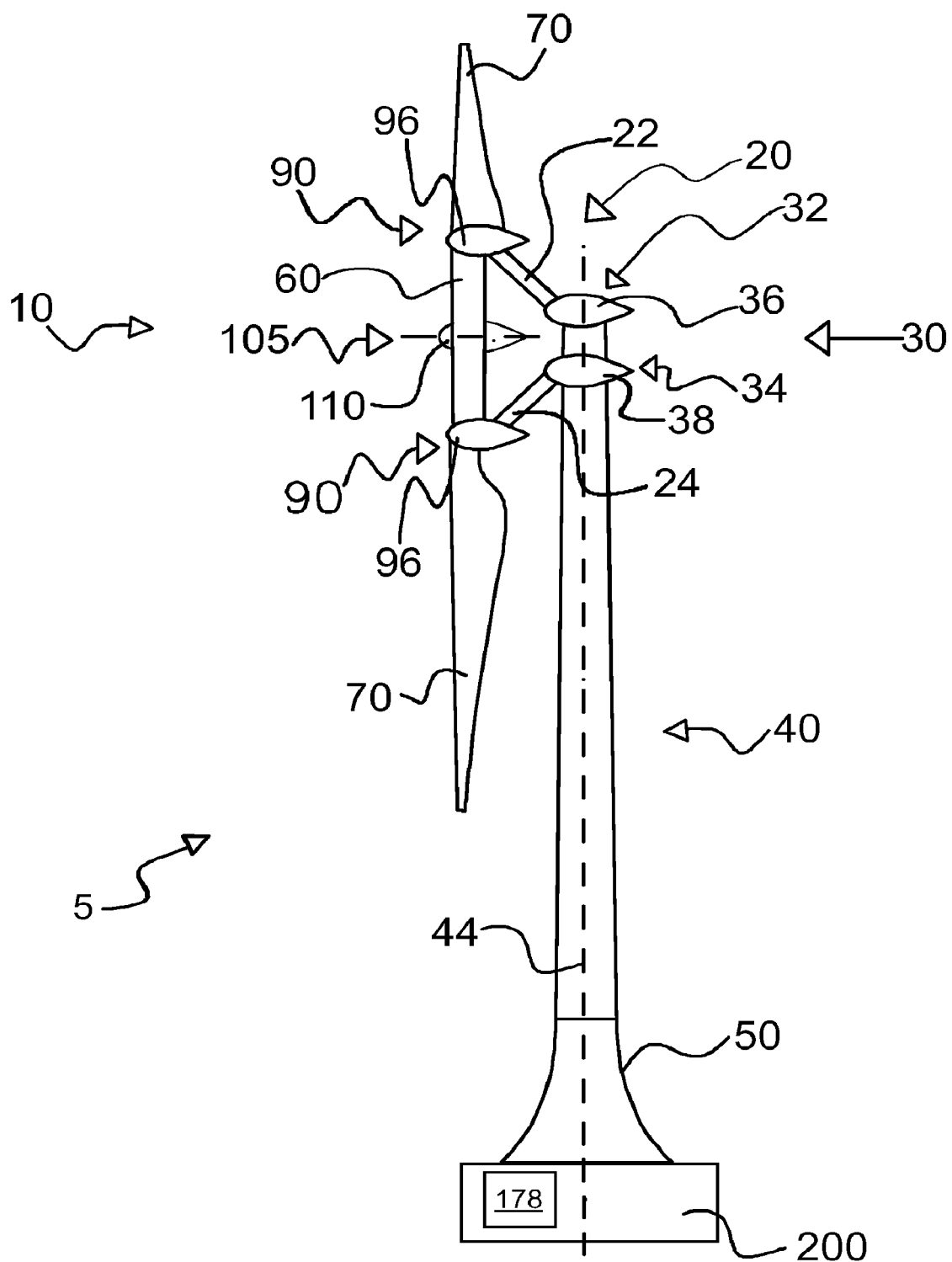
FIG. 2 shows a side view of the exemplary wind turbine of FIG. 1 from plane A-A (shown in FIG. 1)

FIG. 2 shows a side view of the exemplary wind turbine 5 of FIG. 1. The exemplary wind turbine 5 further includes a beam structure 20 typically having an upper beam 22 and a lower beam 24. Typically, each of the beams in the beam structure 20 is respectively attached to the tower 40 by an upper joint element 32 and a lower joint element 34. In typical embodiments, the upper joint element 32 and the lower joint element 34 are spaced apart along a longitudinal axis of the tower 40. In particular, the upper joint element 32 and the lower joint element 34 may form part of a yaw interface 30 that allows rotation of the beam structure 20 about a yaw axis 170 of the tower 40. Typically, the yaw axis is substantially coincident with the longitudinal axis of the tower 40. The upper joint element 32 and the lower joint element 34 may be welded joints or the like, clamping units or the like, or bearing elements or the like.

The upper joint element 32 and the lower joint element 34 might be arranged individually, so that the part of the tower 40 between them remains stationary upon yaw rotation of turbine components. Alternatively, the upper joint element 32 and the lower joint element 34 may be connected through a rotatable element disposed along the longitudinal axis of the tower 40. Typically, the rotatable element consists of a hollow tube enclosing the section of the tower 40 between the upper joint element 32 and the lower joint element 34. The rotatable element may be rotatably coupled to the tower 40, generally through bearings. The rotatable element might, in particular cases, better distribute the load along the longitudinal axis of the tower 40, thus reducing material stress.

Typically, the upper joint element 32 and the lower joint element 34 are respectively shrouded by an upper fairing 36 and a lower fairing 38. The upper fairing 36 and the lower fairing 38 are typically designed to form a streamlined casing, generally having the shape of a smooth line. The upper fairing 36 and the lower fairing 38 reduce aerodynamic drag interference in the adjustment of the yaw angle. Further, the upper fairing 36 and the lower fairing 38 also contribute to reducing the aerodynamic loading on the upper part of the tower 40, thereby reducing material fatigue in the tower 40. Further, the upper fairing 36 and the lower fairing 38 are typically designed to optimize the wind field around the bladed rotor. Generally, the upper fairing 36 and the lower fairing 38 are also designed to avoid contaminations of the elements in the upper joint element 32 and lower joint element 34 by external pollutants, or to protect them against harsh external conditions.

In typical embodiments, each beam of the beam structure 20 is rigidly attached to an outer portion of the annular structure 60. Typically, each of the beams is attached at a different position on the annular structure 60. A higher stability of the overall system is typically achieved when the attachment positions of the beams to the annular structure 60 are equally distributed along an outer portion thereof. In the particular case that the annular structure 60 is an annular generator 62 (see FIG. 6), the beams are typically attached to a generator stator 120 of the annular generator 62.

Typically, each of the blades 70 has a dual support. Typically, one of the supports is attached to the annular structure 60, which, in typical embodiments, consists of an annular generator 62, through first blade interfaces 90. Typically, the other support of the blades 70 is coupled to a central yoke 100 (shown in FIG. 3) through second blade interfaces 105. A dual support structure of the blades 70 allows better handling of the large loads typically originated from large blade spans. In particular, a dual support over span, usually having a dual bearing system, of the blades 70 facilitates an extended swept area of the wind turbine. In particular cases, a dual support of the blades 70 having a dual bearing system facilitates the carrying of large blade bending moments within the capability of the rolling elements in the bearings.

Typically, the blades 70 are attached to the annular structure 60, so that they are rotatable in response to wind impinging upon them. In particular, it is usual that the blades 70 are rotatable about the horizontal rotor axis. In this case, it is usual that the blades 70 are attached to a rotor portion of the annular structure 60, this rotor portion being supported by a static portion of the annular structure 60 in a rotatable manner. As the annular structure 60 is connected to the beam structure 20, the bladed rotor 10 can generally be rotatable about a yaw axis.

In typical embodiments, and as shown in FIG. 2, the central yoke 100 and the second blade interfaces 105 are shrouded by a central fairing element 110. The central fairing element 110 is typically designed to form a streamlined casing on the central yoke 100 and the second blade interfaces 105. In particular, it is typical that the central fairing element 110 has the shape of a smooth line in order to reduce form drag and interference drag on the blades 70, axial loading of the rotor, and interference in the adjustment of the yaw angle. Further, the central fairing element 110 is also designed to avoid contaminations of the central yoke 100 and the second blade interfaces 105 by external pollutants, or to protect them against harsh external conditions.

It is also typical to shroud the first blade interfaces 90 by outer blade fairings 96. Typically, the outer blade fairings 96 are designed to form a streamlined casing, usually in the shape of a smooth line. Thereby, form drag and interference drag on the blades 70 can be reduced. Further, the first blade interfaces 90 and the outer blade fairings 96 are designed to optimize the transmission of the thrust loads acting on the blades 70 to the tower through the beam structure 20. This resulting transferred load facilitates the yaw operation of the wind turbine. In addition, the outer blade fairings 96 reduce aerodynamic loading resulting from bending moments acting on the upper part of the tower 40. In typical embodiments, the outer blade fairings 96 contribute to avoiding contamination of the elements enclosed in the first blade interfaces 90. Further, the outer blade fairings 96 may be designed to optimize the wind field acting on the blades 70.

According to some embodiments, the beam members are arranged in a conical manner, i.e., the distance between the beam members increases in a given direction, typically, in the direction to the tower. In this manner, the strength of the beam structure is increased, the force moments in the beam structure are better distributed, and an effective transmission of blade moments and thrust to the tower may be achieved.

Figure 8:
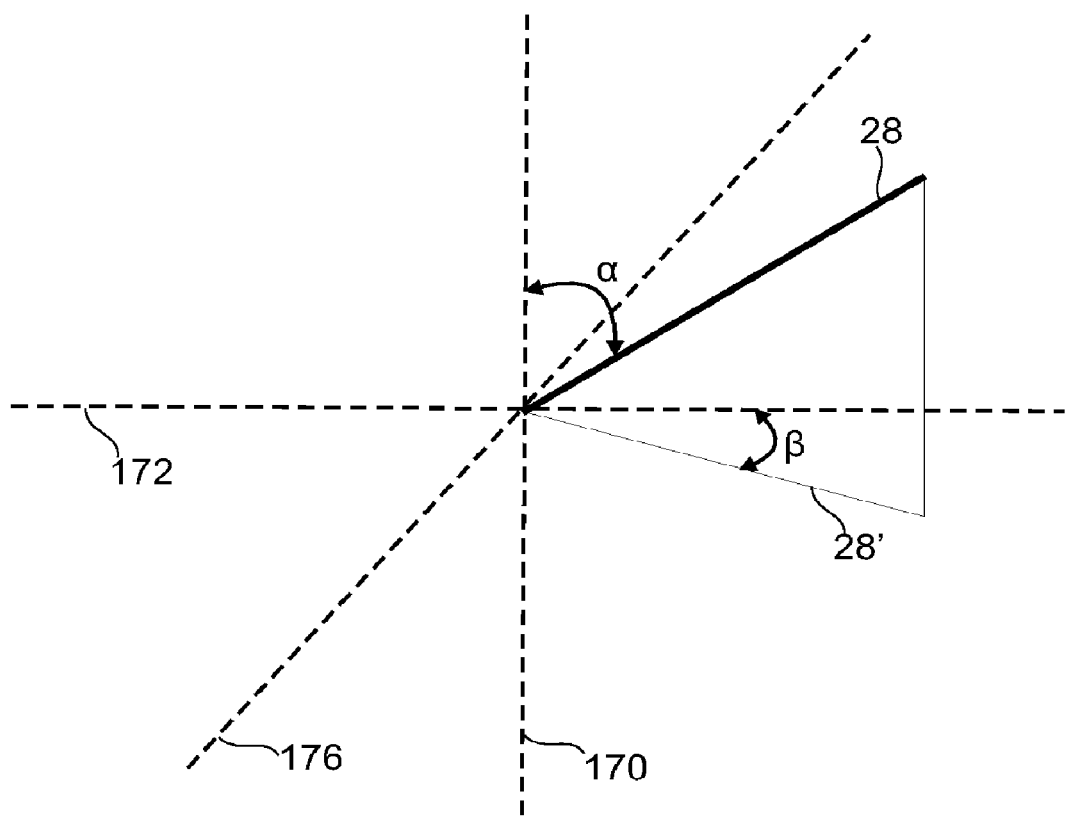

FIG. 8 shows the orientation of a beam member 28 relative to the yaw axis 170 (i.e., vertical axis of rotation of the bladed rotor), and a horizontal axis 172 perpendicular to the horizontal rotational axis of the bladed rotor 176. FIG. 8 shows that the beam member 28 forms an angle alpha $\alpha$ with the axis 170. Further, the beam member forms an angle beta $\beta$ with the horizontal axis 172, i.e., an azimuth angle beta formed by its horizontal projection 28' and the horizontal axis 172.

The beam members may be arranged in a symmetrical layout or in a non-symmetrical layout relative to the horizontal rotational axis of the bladed rotor. In the case the beam members are arranged in a symmetrical layout, it is typical that the beams form an angle alpha of at least 3 degrees, more typically at least 5 degrees, or less than 55 degrees, more typically less than 45 degrees, with the rotational axis of the bladed rotor. In the case the beam members are arranged in a non-symmetrical layout, it is typical that the beam members placed above and below the rotational axis of the bladed rotor form complementary angles of ±alpha and ±(pi/2-alpha), alpha being at least 5 degrees, or typically less than 45 degrees.

Typically, the longitudinal axis of at least one of the beam members forming part of the beam structure forms an angle of at least 5 degrees with respect to the horizontal rotational axis of the bladed rotor.

The beam members may be arranged in a symmetrical or non-symmetrical layout with respect to the yaw axis. In the case the beam members are arranged in a symmetrical layout, it is typical that the beams form an azimuthal angle beta of at least 3 degrees, more typically at least 5 degrees, or less than 55 degrees, more typically less than 45 degrees. In the case the beam members are arranged in a non-symmetrical layout, at least two of the beam members are arranged so that each of them forms a different azimuthal angle. A typical azimuthal angle in an assymmetrical configuration is of at least 3 degrees, more typically of at least 5 degrees, or less than 55 degrees, more typically less than 45 degrees.

A conical angle of the beams in the beam structure 20 typically results in a significant offset between the rotational plane of the bladed rotor 10 and the outer surface of the tower 40. Thereby, a wind turbine according to embodiments described herein facilitates sufficient clearance under normal operational loads, as well as under extreme operational loads resulting in large blade deflections relative to the central yoke 100.

It is also contemplated that the blades 70 might not be connected to a central yoke 100. For example, the blades 70 might be solely connected to the annular structure 60 either at the blade part proximal to the horizontal rotational axis or at any intermediate blade section. Alternatively, the central yoke 100 might be replaced by an additional annular body, placed within the annular structure 60 or external thereto, to which the blades 70 may be coupled through the second blade interfaces 105.

In typical embodiments, the tower base 50 is wider than the tower upper part 42. Thereby, the tower base 50 and the foundations of the tower 40 can better carry the high mass typical of large-scale wind turbines along with the large moments that may be generated during operation of the wind turbine.

Typically, the tower 40 and the tower base 50 are designed hollow in order to reduce the weight of the wind turbine structure. Thus, the tower 40 might be designed in the form of a hollow shell. Typically, the wind turbine further includes a first interface between the tower and the tower base. It is typical that the tower is designed as a hollow shell, the tower base being an extension of the hollow shell, and the first interface having at least two different curvature values.

It is also contemplated that the wind turbine may include a tower foundation and a second interface between the tower base and the tower foundation. Further, the tower base may be designed to be an extension of the tower foundation. The outer surface of the second interface may have at least two different curvature values. Typically, the tower base may be an integral part of the tower foundation. Alternatively, the tower base may be constructed in a segmented manner along the longitudinal axis.

Typically, the section of the tower base is designed taking into account the strength distribution in the tower shell and the force distribution in the interface between the tower base and the tower foundation according to both static and dynamic loading of the bladed rotor. Typically, the tower base cross section is designed using a primary section profile based on a profile function having a cylindrical form, a conical form, a polynomial form, a hyperboloidal form, a catenoidal form, an exponential form, or the like. In addition, the tower base cross-section may be formed with any combination of the profile functions listed above. The strength distribution in the tower shell may be optimized using the above listed profile functions.

According to aspects of the present disclosure, an interface may be interposed between the tower and the tower base. It is typical that the curvature of the interface surface changes along its axis. Thereby, the transition of the surfaces of the tower and the tower base can be optimized in a manner such that the tower base robustly carries weights and loads from the tower. Typically, the interface is applied when the tower is designed as a hollow shell.

The axial section of the tower and the base may be designed to be axi-symmetric or non axi-symmetric. Typically, the axial section is combined with a three-dimensional surface lofting in order to obtain a profile functions along the height axis. Typically, the tower height is at least ten times the tower diameter or at least ten times the characteristic tower width. The tower diameter is chosen to provide sufficiently robust structural support for the wind turbine, while keeping the tower weight low.

The height of the tower base is typically designed to provide robust support to the wind turbine while keeping material costs in mind. Typically, the base height is at least 25% of the tower radius or at least 25% of the half of the characteristic tower width. The base height may be higher than 10% of the tower height, the base height contributing to the tower height.

Typically, the tower base is adapted for being coupled to on or off-shore foundations. Large-scale wind turbines might be particularly suited for offshore wind power in contrast to standard wind turbines. In order to reach the same power output, a wind park built with standard wind turbines usually requires a higher number of units than a wind park with large-scale wind turbines. However, the cost of foundations does not rise in proportion to the size of the machine, and maintenance costs are largely independent of the size of the machine. Thus, large-scale wind turbines may be particularly cost effective when used for off-shore wind parks.

According to aspects of the present disclosure, a base-foundation interface may be interposed between the tower base and the tower foundation. It is typical that the curvature of the base-foundation interface changes along the axis of the interface. Thereby, the transition between the tower base and the tower foundation can be optimized in a manner such that the foundation robustly carries weights and loads from the wind turbine.

The tower base may be formed as an integral part of the tower foundation. Alternatively, the tower base may be constructed in a segmented manner along the longitudinal axis. More specifically, the tower base may be formed by integral segments coupled to each other. The segments may be made of different materials or have different surface curvatures or surface shapes. A tower base being an integral part of the tower foundation typically increases robustness of the turbine construction. A segmented tower base facilitates optimizing the transfer of weight and loads to the tower foundation.

Figure 3:
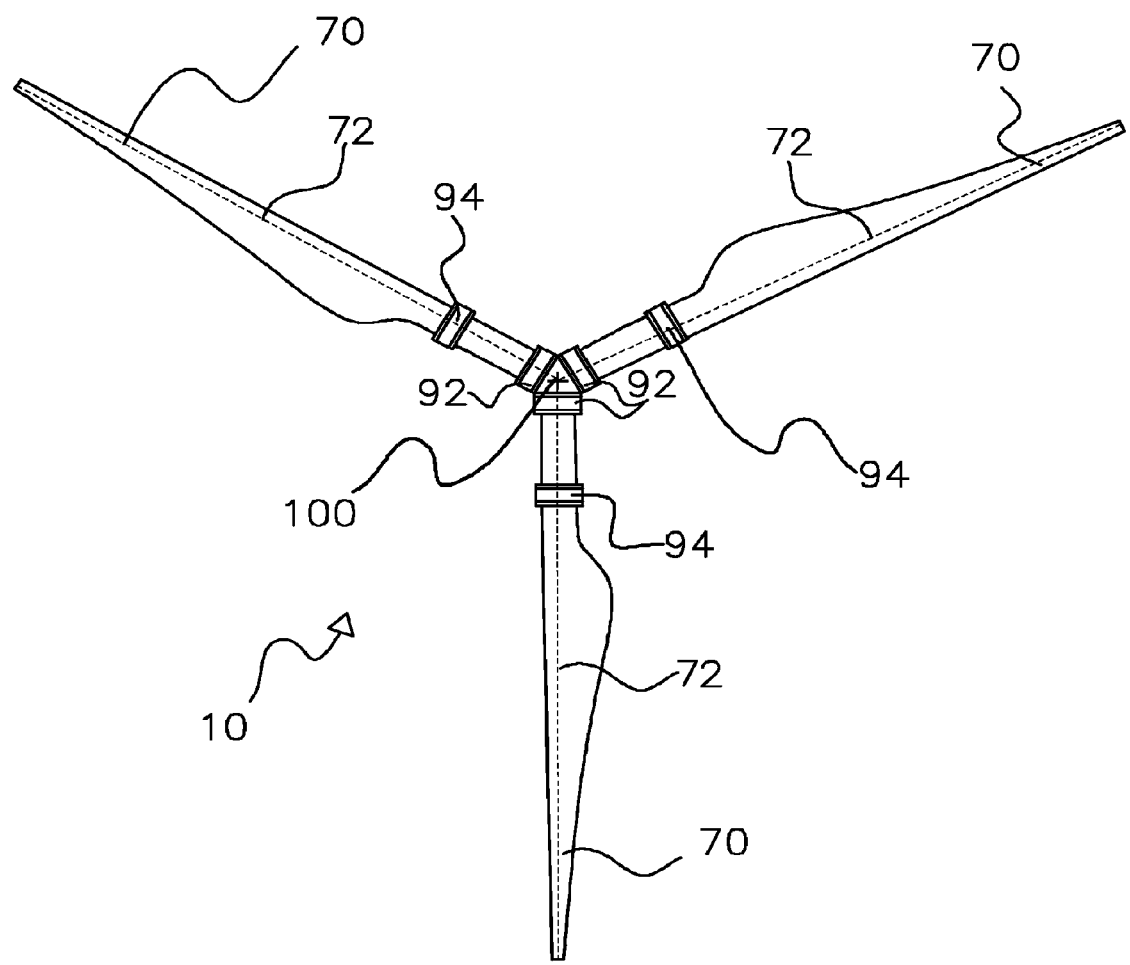
FIG. 3 shows a schematic view of a bladed rotor of another wind turbine according to embodiments described herein.

FIG. 3 shows a schematic view of a bladed rotor 10 of a wind turbine according to embodiments of the present disclosure. In the schematic view, the outer blade fairings 96 and the central fairing element 110 have been omitted. The blades 70 typically include an inner pitch bearing 92 and an outer pitch bearing 94 for rotation of the blades 70, or parts thereof, about a pitch axis 72 (i.e., a longitudinal axis of the blade). Namely, the inner pitch bearing 92 and the outer pitch bearing 94 are typically for adjusting the pitch angle of the blades. Typically, a dual bearing configuration of the blades better distributes the load on the bearing elements and facilitates the pitch operation of blades having a large span. In particular, a dual bearing configuration typically reduces the individual loading on the rolling elements in the bearings. In this manner, it is typical that the average operating life of the bearing is extended.

Typically, the inner pitch bearing 92 is interposed between each of the blades 70 and the central yoke 100. In a typical arrangement, the inner and outer rings of the inner pitch bearing 92 are bolted to the blades 70 and the central yoke 100, respectively. Typically, the outer pitch bearing 94 is disposed at an intermediate section of the blade, spaced apart from the inner pitch bearing 92, and coupled to a rotor portion in the annular structure 60. In the case the annular structure 60 consists of an annular generator 62, the outer ring of the outer pitch bearing 94 is typically attached to the generator rotor 130. In general, any type of available bearings can be used, such as, for example, single-row roller bearings, single-row ball bearings, double-row ball bearings, or triple-row roller bearings. The bearing type is typically chosen to have a capacity within the loading requirements of the wind turbine.

In typical embodiments, the wind turbine includes a pitch control (not shown) for controlling the pitch angle of the blades 70. Usually the pitch control adjusts the pitch angle of the blades 70 in response to wind velocity and power output of the wind turbine. Generally, the pitch control includes a computer, which generally processes data related to power output, wind speed, or wind direction. According to this data, the computer may adjust the pitch of the blades 70 in order to keep the rotor blades at an optimal angle. Thereby, the power output may be maximized for different wind speeds. Further, the pitch control may be used for protecting the wind turbine against extreme wind conditions.

In typical embodiments, pitch control facilitates increasing energy capture and provides an aerodynamic braking capability. In addition thereto, pitch control is typically used to reduce extreme loads acting on the wind turbine when shut-off. The latter functionality of the pitch control is particularly desirable for large-scale wind turbines. A variety of pitch actuation systems might be adopted, including arrangements in which each blade has its own actuator, and arrangements in which a single actuator pitches all the blades.

The blades 70 may be configured for being individually actuated. In the case each blade 70 is provided with an actuator (not shown), it is typical to position the blade pitch actuator in a mounting interface 160 of the generator. Thus, the blade may be actuated through the outer pitch bearing 94. As an alternative, a blade pitch actuator may be located in the central yoke 100, so that the blade may be actuated through the inner pitch bearing 92.

The pitch actuation in the wind turbine is typically performed by means of direct hydraulic, pneumatic, mechanical, or electrical actuating devices. Alternatively, the pitch actuation in the wind turbine may be performed by means of indirect transmission from electro-magnetic or mechanical torque actuation generated by the wind force driven rotation from the generator rotor relative to the generator stator.

The pitch control usually includes a close-loop control system, typically based on PI, PID controllers, or optimal feedback methods such as self-tuning controllers, LQG and H control methods, fuzzy logical controllers, or neural network methods.

Load sensing devices may be arranged in the blades, the blade pitch actuators, or in any of the inner or outer bearings with or without devices for sensing the angular orientation of the blades. Typically, these sensing devices may be used in control systems for actively damping the rotation of the bladed rotor, reducing collective or individual horizontal transverse azimuthal wind loading of the blades, and/or individual blade Coriolis force component acting on the blades as result of dynamic loading. Typically, the general task of these control systems is to maximize collective or individual blade aerodynamic efficiency.

Figure 4:
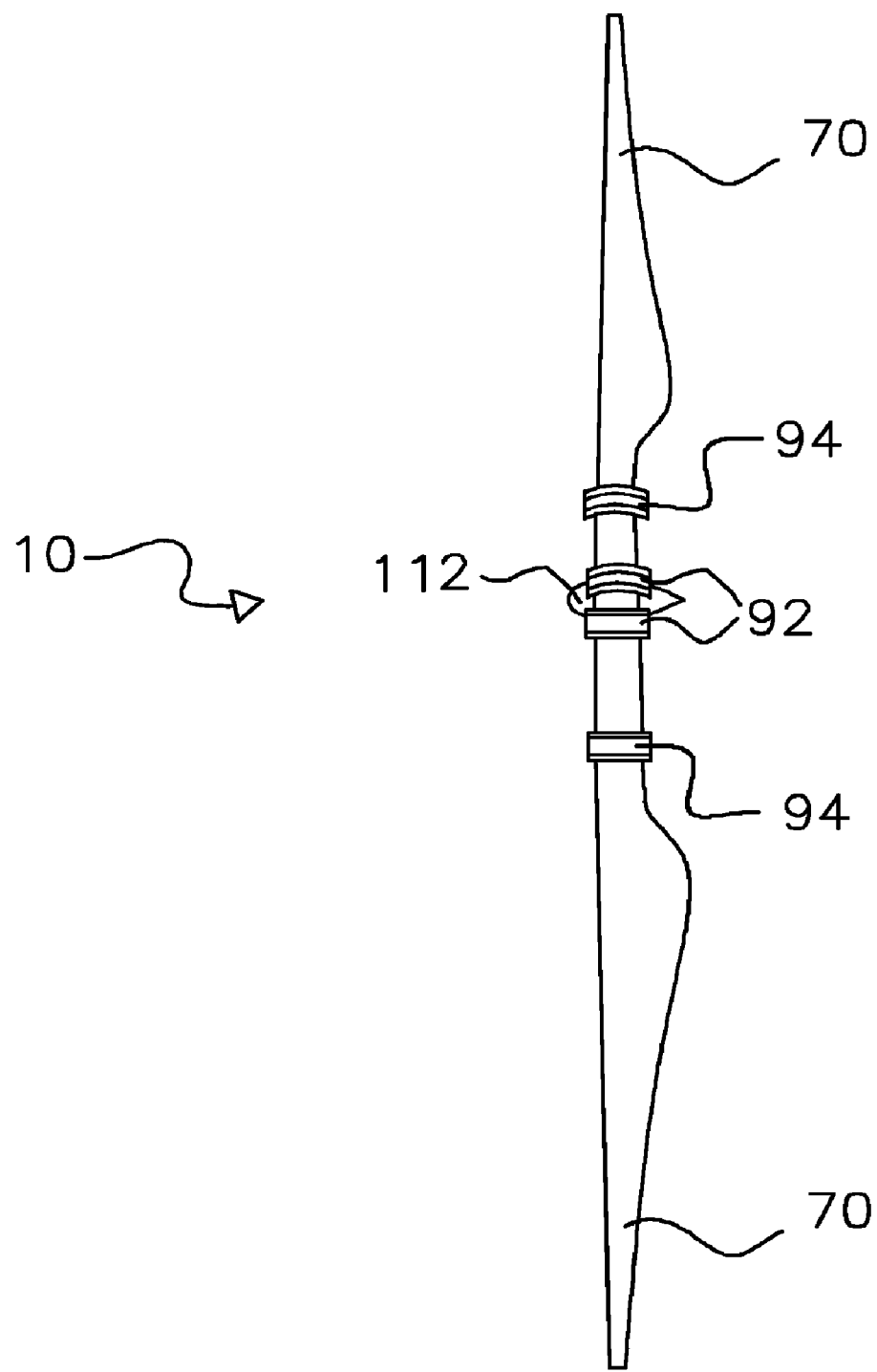
FIG. 4 shows a schematic view of a bladed rotor of yet another wind turbine according to embodiments described herein.

FIG. 4 shows a schematic view of a bladed rotor 10 of a wind turbine according to embodiments described herein. The exemplary bladed rotor 10 includes a central fairing element 112 enclosing the central yoke 100 of the bladed rotor 10. In the exemplary embodiment, the inner pitch bearings 92 are disposed outside the central fairing element 112. In such a configuration of the central fairing element 112, it is typical that the inner pitch bearings 92 are also shrouded by additional fairings (not shown). Alternatively, the inner pitch bearings 92 may be shrouded by a single fairing element (not shown) with an annular form. Any of these configurations of the central part of the bladed rotor 10 typically improves the aerodynamic behaviour of a wind turbine according to some embodiments of the present disclosure.

Figure 5:
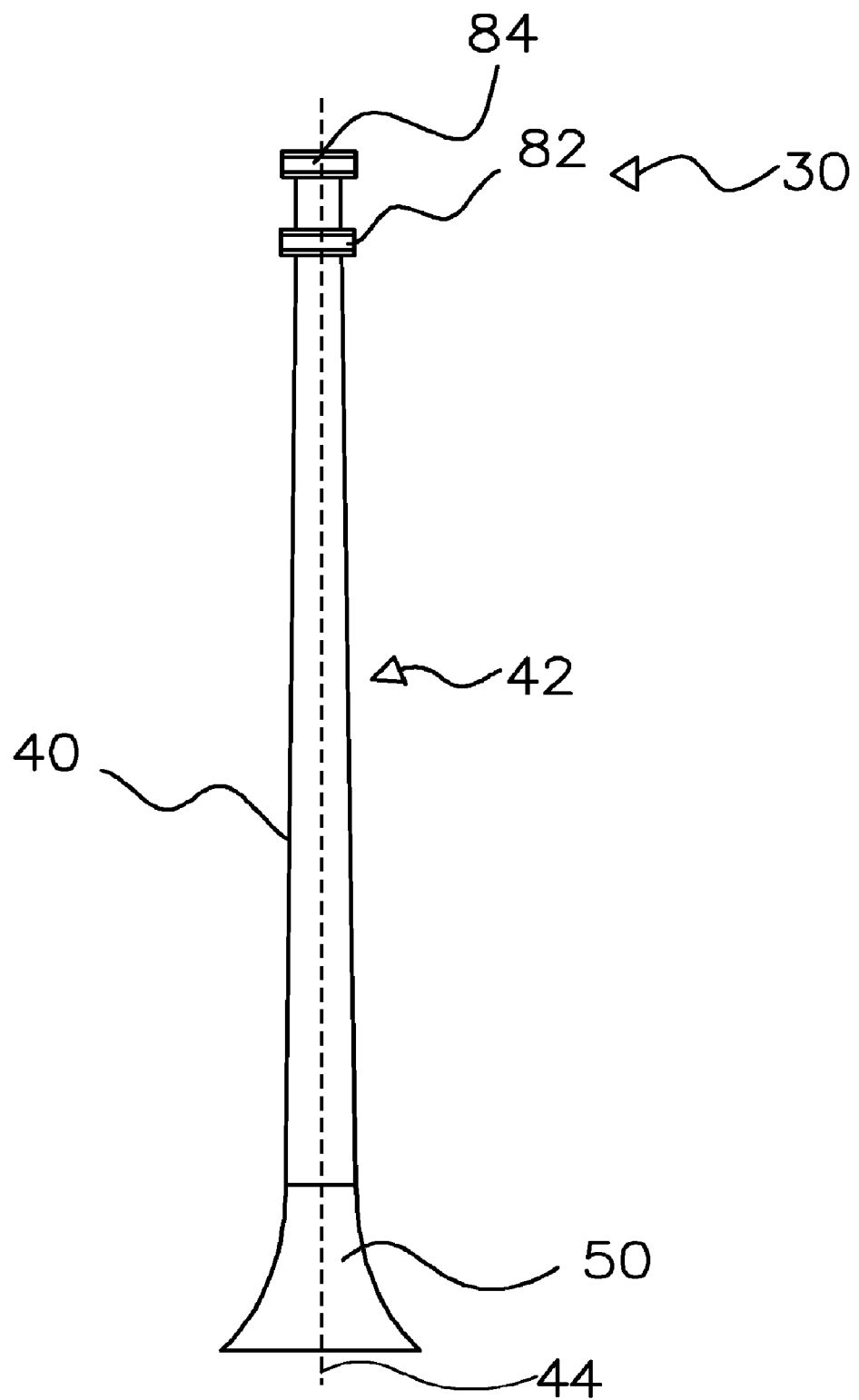
FIG. 5 shows a schematic view of a tower of a further wind turbine according to embodiments described herein.

FIG. 5 shows a schematic view of a tower of a wind turbine according to embodiments described herein. The exemplary tower 40 includes a yaw interface 30. The tower 40 typically includes an upper fairing 36 and a lower fairing 38 (omitted in FIG. 5) for shrouding elements of a yaw interface 30 of the tower 42. The yaw interface 30 is typically disposed in an upper part of the tower 42. Typically, the yaw interface 30 includes a plurality of bearings 82, 84 spaced apart along the yaw axis 44 of the tower 40. It is also typical that at least one of the bearings 82, 84 is connectable to a joint element (not shown) adapted for attachment of a beam to the tower 40, so that the beam is rotatable about a yaw axis. Typically, the wind turbine tower 40 further includes at least one actuation device (not shown) coupled to the yaw interface for adjustment of a yaw angle.

The yaw interface 30 typically includes a lower yaw bearing 82 and an upper yaw bearing 84 for enabling rotation about the yaw axis 44. Typically, the upper beam 22 and the lower beam 24 of a beam structure are respectively coupled to the lower yaw bearing 82 and the upper yaw bearing 84, so that the beam structure 20 is rotatable about the yaw axis.

As set forth above, it is typical that at least some of the elements of the yaw interface 30 are shrouded by fairings. Typically, these fairings are implemented in a manner such that they rotate along with the beams in a beam structure 20 coupled to the yaw interface. The fairings may be connected to more than one beam member of the beam structure. Typically, the upper fairing 36 is connected to two or three beam members and the lower fairing 38 is connected to a single beam member. Typically, the termination of each beam is individually connected to the respective upper or lower fairing through any of at least one bolted flange interface, at least one welded interface, at least one bonded interface, at least one laminated interface, an assembly of at least two casted parts, an assembly of at least two FRP fiber reinforced plastics.

Typically, the yaw interface 30 is for rotating the upper part of the wind turbine in order to keep the turbine facing into the wind. Usually, the upper part of the wind turbine includes the bladed rotor 10, the annular structure 60 or the annular generator 62, and the beam structure 20.

Typically, the lower yaw bearing 82 and the upper yaw bearing 84 are spaced apart along the vertical direction. Typically, the distance between the bearings is chosen taking into consideration the configuration of the beam structure (i.e., length and spatial orientation of the beam members). Usually, this distance corresponds to at least the radius at the tower top. Typically, this distance is smaller than the diameter of the generator stator. Alternatively, the bearings may be arranged in a manner such that the distance between them is even greater than the diameter of the generator stator. Typically, the outer rings of the yaw bearings are attached to the respective beams, while the inner rings are attached to the tower. A dual yaw bearing configuration as described herein typically achieves a better distribution of the load on the bearing elements and facilitates the yaw operation of large wind turbines. Furthermore, the individual loading on the rolling elements in the bearings is typically reduced. Therefore, a dual yaw bearing configuration typically extends the average operating life of the bearing.

The yaw interface in the present disclosure is to be taken to include any kind of arrangement allowing the rotation of a structure in the wind turbine about a vertical axis, typically referred to as the yaw axis. The yaw interface may be configured to allow free rotation of the rotor. Alternatively, the yaw interface is configured to adjust to a predetermined yaw angle. Further, the yaw interface may combine elements allowing free rotation of the structure and other elements setting a constraint in the yaw angle of the structure.

The lower yaw bearing 82 and the upper yaw bearing 84 might be equipped with brake devices for preventing unwanted yaw motion under almost any circumstance. The brake device may be configured to operate the wind turbine in fixed yaw. The yaw bearings may be designed to respond to yaw moments transmitted thereto through the annular structure 60 and the beam structure 20 and arising from differential loading on the blades 70. In order to deal with these, typically large, generated moments, different strategies are contemplated. These strategies may include passive yaw systems such as fixed yaw, friction damped yaw, soft yaw, or damped free yaw. Typically, these strategies include actively controlled free yaw.

In typical embodiments, the wind turbine includes a yaw control system 178 (shown in FIG. 2) for adjusting a yaw angle of the bladed rotor 10. A design where the bladed rotor 10, the annular structure 60 or the annular generator 62, and the beam structure 20 are free to yaw is also contemplated. Usually, in a free yaw design, the wind turbine will naturally remain facing the wind. However, a yaw error might occur, and, in these cases, yaw control might be used to maximize energy capture by the wind turbine. In the present disclosure, yaw error is to be taken as an angle formed between the horizontal rotation axis of the bladed rotor and the main wind direction. Further, yaw control might be used for start-up of the wind turbine. Typically, yaw control originates higher yaw loads on the bearings. Especially for the case of large-scale wind turbines, a dual yaw bearings configuration is more typically used, since loads and moments acting on the bearings may be better distributed.

Typically, the wind turbine includes actuation devices coupled to the yaw interface for adjustment of a yaw angle. Generally, the actuation devices are based on direct hydraulic, pneumatic, mechanical, or electrical actuation. The actuation devices might be directly coupled to bearings forming part of the yaw interface. In particular, the actuation devices might be coupled to only a fraction of the bearings. For example, a yaw interface may have an upper and lower bearing in which the upper bearing is coupled to an actuation device to transmit a torque about the yaw axis and where the lower bearing allows free rotation about the yaw axis. Further, it is typical that the actuation devices are controlled by a yaw control system. Such actuation devices typically facilitate the control of the yaw angle through the yaw control system in a precise manner.

In typical embodiments, the yaw angle is controlled by measuring a yaw error. Typically, the yaw angle of the rotor is adjusted by transmitting a force torque to the bladed rotor through the multiple beams. Typically, the yaw error is measured by sensing the wind direction through at least one direct or indirect wind direction sensor such as a wind direction vane. In some cases, the torques acting on the bearings in the yaw interface may be sensed in order to optimize the control of the yaw angle or for implementing security measurements. When any of these sensing devices detects that excessive torque is acting on one of the bearings in the yaw interface, then the wind turbine might be disconnected or the yaw angle might be modified to reduce the torque.

Typically, a yaw control system operates by processing a yaw error signal from a vane mounted on top of the wind turbine and calculating a set point for the yaw angle. This set point is usually transmitted to a yaw actuator system in order to correct the yaw angle of the wind turbine. Since the yaw control system typically has a slow response, a simple deadband controller may be sufficient. However, for some particular applications, more complex control algorithms may be convenient. For example, such control algorithms may be based on a PI or PID controllers, a feed forward loop, or optimal feedback methods such as self-tuning controllers, LQG and H control methods, fuzzy logical controllers, state based control, linear or non-linear physical equivalent model based control, or neural network methods. Complex control algorithms are more typically used when the wind turbine is operated in high winds.

Figure 6:
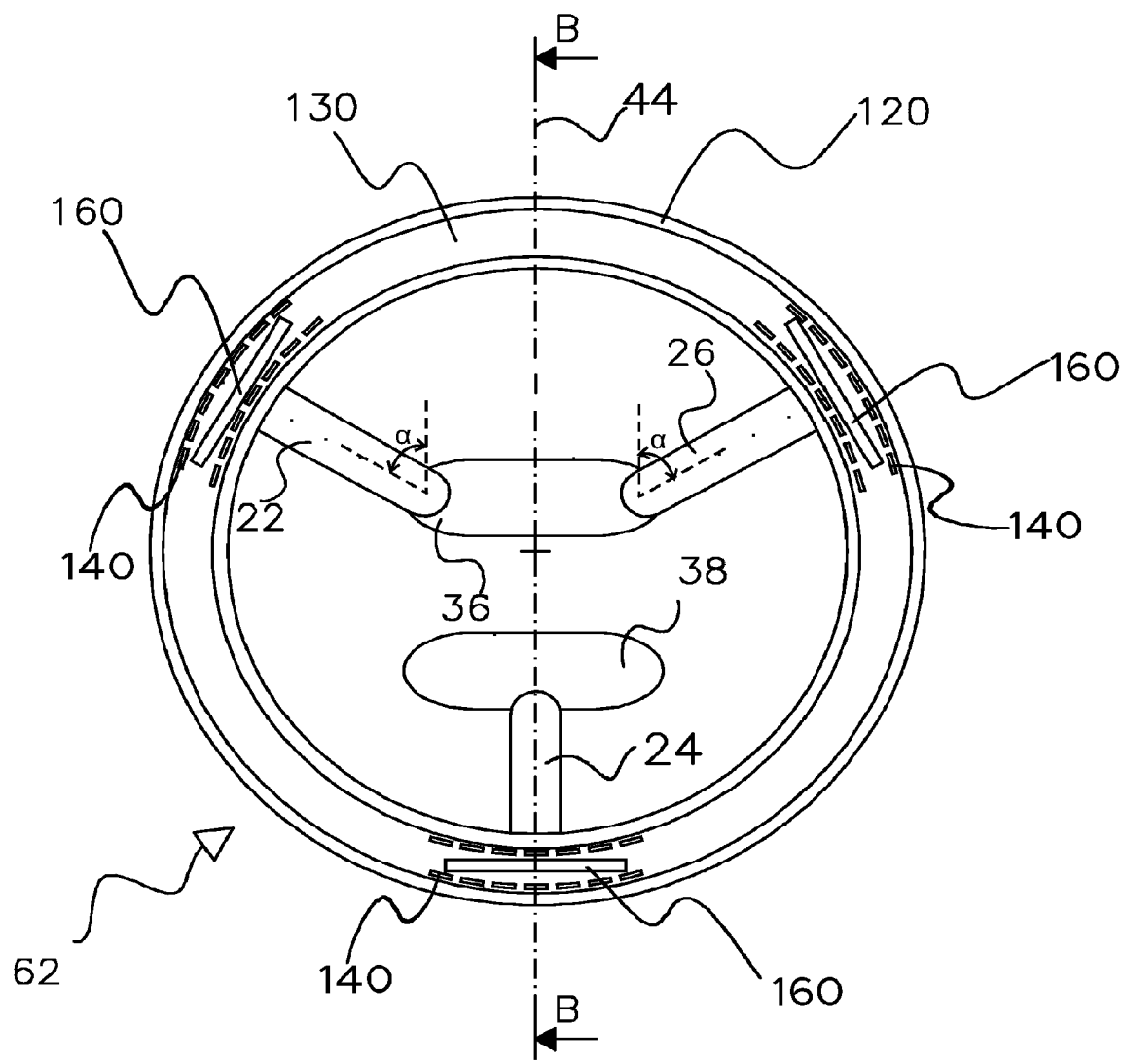
FIG. 6 shows a schematic view of a cross-section of an annular generator coupled to a beam structure of another wind turbine according to embodiments described herein.

In typical embodiments of this disclosure, the electrical generator and the rotor are integrated. FIG. 6 shows a schematic view of a cross-section of an annular generator 62 coupled to a beam structure 20 of a wind turbine according to embodiments described herein. The exemplary beam structure 20 shown in FIG. 6 includes three beam members, an upper beam 22, a lower beam 24 and a third beam 26. The upper beam 22 and the third beam 26 are typically coupled to the upper joint element 32, which is typically shrouded by the upper fairing 36. In the typical configuration shown in FIG. 6, the upper beam 22 and the third beam 26 are arranged symmetrically with respect to the yaw axis 44 and form an angle alpha α therewith (see also FIG. 8). The lower beam 24 is coupled to the lower joint element 34, which may be shrouded by the lower fairing 38. The upper fairing 36 and the lower fairing 38 are typically for reducing aerodynamic drag on the wind turbine as set forth above. Typically, the upper joint element 32 and the lower joint element 34 form part of the yaw interface 30. In the configuration shown in FIG. 6, the yaw interface 30 is for implementing yaw rotation about the yaw axis 44 of the beam structure 20 and the elements supported thereby.

The integration of the generator and the rotor, as exemplarily shown in FIG. 6, targets lightweight structural design of the wind turbine by combining the function of different components. In particular, such integration of component functions facilitates building the wind turbine without massive elements such as, for example, a nacelle.

The annular generator 62 includes a generator stator 120 and a generator rotor 130, which typically also has an annular shape. In the present disclosure, the term "annular generator" is to be taken to include electrical generators having a through opening, or clearance, in the center of the generator. In typical embodiments, the generator stator 120 is radially supported by the beam structure 20, typically at equidistant points across the perimeter of the generator stator 120. That is, it is typical that the connection points of the upper beam 22, the lower beam 24 and the third beam 26 are equally distributed along the perimeter of the generator stator 120. In typical embodiments, the generator stator 120 is connected to at least two beam members of the beam structure 20. Typically, the beams are connected to the generator stator 120 at the first blade interfaces 90 by any of at least one bolted flange interface, at least one welded interface, at least one bonded interface, at least one laminated interface, an assembly of at least two casted parts, or an assembly of at least two FRP fiber reinforced plastics.

Typically, the bladed rotor 10 is attached to the generator rotor 130. In particular, the bladed rotor 10 is typically attached to the generator rotor 130, so that both of them rotate synchronously. In particular, the blades 70 are mounted to the generator rotor 130 with the first blade interfaces 90 coupled to generator mounting interfaces 160. Typically, each part of the generator mounting interfaces 160 for coupling an individual blade to the generator rotor 130 is either a modular assembly of separated components attached to the generator rotor 130, or at least one integral casted or one integral FRP fiber reinforced part. Generally, as set forth above, the first blade interfaces 90 includes an outer pitch bearing 94. FIG. 6 exemplarily depicts three groups of rolling elements 140 distributed across the circumference of the generator stator 120. The rolling elements 140 may be distributed to fully or partially cover the circumference of the generator stator 120.

In typical embodiments, the generator stator 120 rotatably supports the generator rotor 130. In particular, the generator rotor 130 may be configured to rotate relative to the generator stator 120 through rolling elements 140. Typically, the rolling elements 140 consist of a double row of rolling elements such as balls, rollers, mechanical bearing system, or the like. Typically, the rolling elements 140 are assembled into the annular generator 62 such that the position of the rolling elements 140 remains stationary relative to the generator rotor 130.

Figure 7:
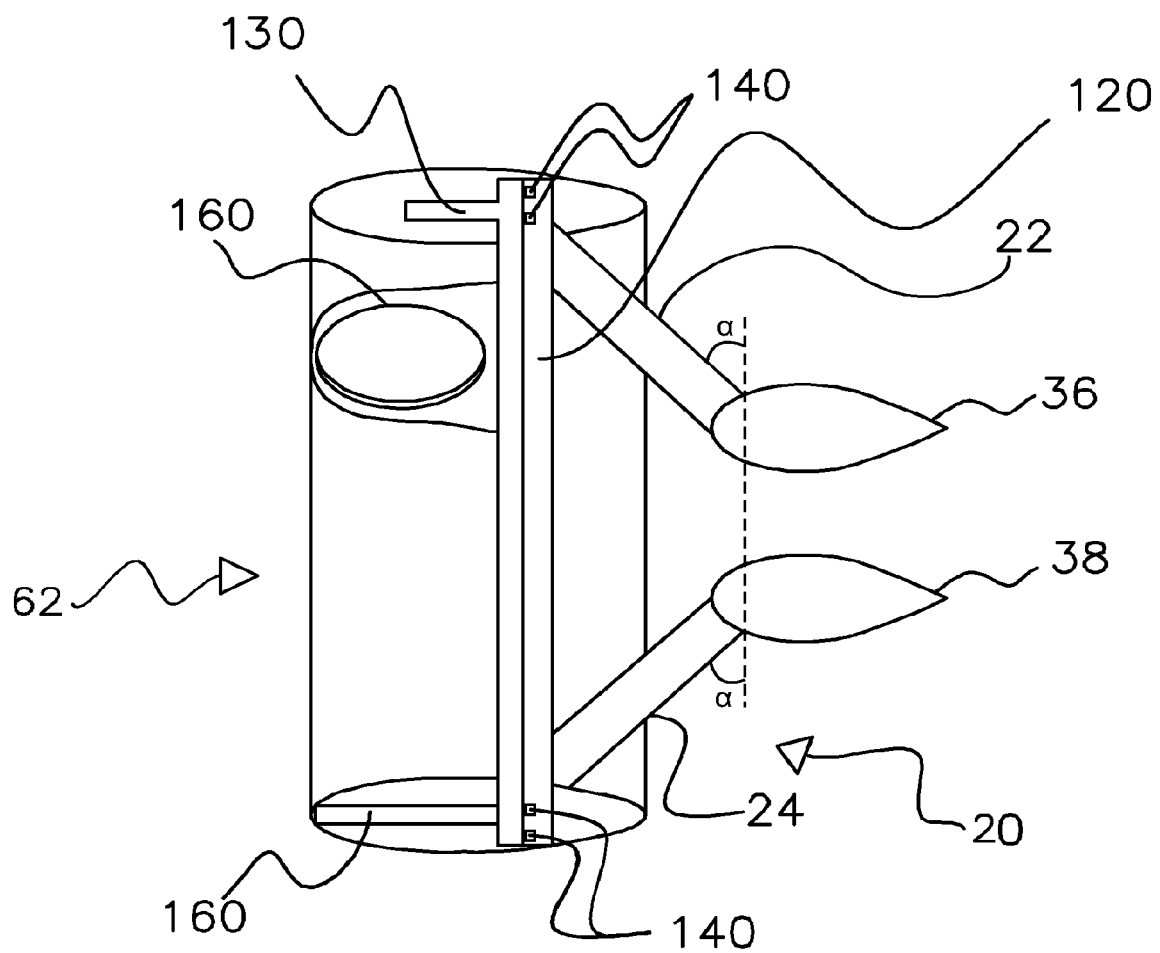
FIG. 7 shows a schematic view of a portion of an annular generator coupled to a beam structure of yet another wind turbine according to embodiments described herein; and, FIG. 8 shows a schematic representation of the spatial distribution of a beam member of a wind turbine according to embodiments described herein.

FIG. 7 shows a schematic view of a portion of an annular generator 62 coupled to a beam structure 20 of a wind turbine according to embodiments described herein. It is shown therein that the generator rotor 130 may be placed contiguous to the generator stator 120. In particular, the generator rotor 130 may be mounted on the rolling elements 140, so that it can rotate relative to the generator rotor 130. In addition, FIG. 7 shows an upper beam 22 and a lower beam 24 arranged in a symmetrical layout forming an angle alpha α with the yaw axis of the wind turbine.

Elements from known generator technology with which a person of skill in the art will be familiar can be used with the embodiments described herein without this being described in more detail here.

Typically, the wind turbine according to embodiments of this disclosure operates as follows. The wind turbine is typically configured with pitch actuated blades supported by a central yoke and mounted on a generator rotor forming part of an annular generator. In response to wind impinging upon the blades, a rotor torque may be generated. As a result of the rotor torque, the generator rotor may revolve inside a generator stator through rolling elements. As set forth above, the position of the rolling elements typically remains stationary relative to the generator stator. Thrust loads acting on the bladed rotor are typically transmitted to the tower through a beam structure which may include multiple beams. Thereby, thrust loads are typically transferred in an optimal manner to a yaw operated tower.

Usually, the generator rotor includes at least one permanent magnet. Typically, the generator rotor includes a series of permanent magnets distributed across the generator rotor. Also typically, the generator stator includes at least one multiple pole electrical winding or the like. Thus, the permanent magnets may rotate with respect to the multiple pole electrical windings and thereby generate an alternating current on an output system. Typically, the output system consists of a series of electrical pole phase outputs. In particular, the alternating current typically varies with the speed of the wind.

Typically, the wind turbine includes a power converter system disposed either in the beam structure or in the tower. Typically, the power converter system converts the alternating current generated by the annular generator into a high-voltage generally fixed at a standard electrical system frequency, such as 50 Hz or 60 Hz, or other network frequency of a wind park.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. While various specific embodiments have been described, those skilled in the art will recognize that the disclosure can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
   a) a tower including a yaw interface;
   b) a bladed rotor including at least one blade rotatable in response to wind impinging upon said at least one blade; and,
   c) a beam structure configured to support said bladed rotor, said beam structure including at least two beam members, each of the at least two beam members being coupled to said yaw interface by at least one joint element, so that said bladed rotor is rotatable about a yaw axis of said wind turbine;
   wherein at least two of the joint elements are spaced apart along a longitudinal axis of said tower.

2. The wind turbine according to claim 1, wherein the at least two joint elements include a bearing device.

3. The wind turbine according to claim 1, wherein at least one of the joint elements is shrouded by a fairing element including a streamlined casing.

4. The wind turbine according to claim 1, further comprising a yaw control system configured to adjust a yaw angle of said bladed rotor.

5. The wind turbine according to claim 1, further comprising an annular generator for generating electricity, said annular generator including a generator stator and a generator rotor, wherein:
   said bladed rotor is rigidly coupled to said generator rotor;
   said generator stator rotatably supports said generator rotor, so that said generator rotor is rotatable about a rotor axis; and,
   said generator stator is radially supported by said beam structure.

6. The wind turbine according to claim 5, wherein said annular generator comprises at least one rolling element for allowing rotation of said generator rotor relative to said generator stator.

7. The wind turbine according to claim 5, wherein the blade is coupled to said generator stator through a first blade interface in a manner such that at least a portion of the blade is rotatable about a pitch axis.

8. The wind turbine according to claim 7, wherein said first blade interface is shrouded by a fairing element including a streamlined casing.

9. The wind turbine according to claim 7, wherein said first blade interface includes a bearing device including at least one rolling element for rotation of said at least one blade about the pitch axis.

10. The wind turbine according to claim 1, wherein the blade is coupled to a central yoke through a second blade interface.

11. The wind turbine according to claim 10, wherein said central yoke and said second blade interface are shrouded by a fairing element including a streamlined casing.

12. The wind turbine according to claim 10, wherein the blade is coupled to said central yoke in a manner such that at least a portion of the blade is rotatable about a pitch axis.

13. The wind turbine according to claim 1, wherein said tower comprises a tower upper part and a tower base; and, said tower base is wider than the tower upper part.

14. A wind turbine for generating electrical energy by wind energy, comprising:
   a) a tower;
   b) a yaw interface disposed in an upper part of said tower, said yaw interface including a plurality of bearings spaced apart along a longitudinal axis of said tower;
   c) an annular structure including a rotor portion and a static portion; and,
   d) a bladed rotor including at least one blade rotatable in response to wind impinging upon the at least one blade, said bladed rotor being supported by the rotor portion;
   wherein said annular structure is coupled to the yaw interface, so that said bladed rotor is rotatable about a yaw axis.

15. A wind turbine according to claim 14, wherein the annular structure is an annular generator, the rotor portion is a generator rotor and the static portion is a generator stator.

16. The wind turbine according to claim 15, wherein said annular generator is coupled through a beam structure to the tower, the beam structure optionally including at least two beam members.

17. The wind energy turbine according to claim 16, wherein the beam members are coupled to said generator stator through a plurality of joints on said generator stator, the plurality of joints being spaced apart.

18. The wind turbine according to claim 15, wherein said annular generator comprises rolling elements configured for allowing rotation of said generator rotor relative to said generator stator.

19. The wind turbine according to claim 14, further comprising a yaw control system for adjusting a yaw angle of said bladed rotor.

20. A method for controlling a yaw angle of a wind turbine, the wind turbine comprising a tower, a bladed rotor, a beam structure including multiple beams supporting the bladed rotor and a plurality of bearings placed in the tower, each of the bearings being spaced apart along the longitudinal axis of the tower, the plurality of bearings being coupled to the beam structure, the method comprising:
   a) measuring a yaw error; and,
   b) adjusting the yaw angle of said bladed rotor in order to decrease said yaw error;
   wherein the yaw angle of said bladed rotor is adjusted by coupling a torque force to said multiple beams through said plurality of bearings.

* * * * *